United States Patent Office 3,557,163
Patented Jan. 19, 1971

3,557,163
N'-SUBSTITUTED N-ARYLSULPHONYL UREAS
Henri Dietrich, Arlesheim, Basel-Land, Switzerland, assignor to Geigy Chemical Corporation, Ardsley, N.Y., a corporation of New York
No Drawing. Filed Dec. 15, 1967, Ser. No. 690,774
Claims priority, application Switzerland, Dec. 22, 1966, 18,374/66
Int. Cl. C07c 127/100
U.S. Cl. 260—397.7                                    10 Claims

ABSTRACT OF THE DISCLOSURE 1-arylsulphonyl-3-(octahydro-1,2,4-methenopentalen-5-yl)-ureas and salts thereof with bases, which compounds have useful hypoglycaemic action, as well as starting materials for their production; therapeutic compositions containing these ureas or their pharmaceutically acceptable salts and processes for producing hypoglycaemic effects in mammals. An illustrative embodiment is 1-(p-tolylsulphonyl)-3-(octahydro-1,2,4-methenopentalen-5-yl)-urea.

---

The invention relates to N'-substituted N-arylsulphonyl ureas having valuable pharmacological properties. More particularly the invention pertains to 1-arylsulphonyl-3-(octahydro-1,2,4-methenopentalen-5-yl)-ureas and salts thereof with inorganic or organic bases. The invention is further concerned with processes for the production of these ureas and salts and also comprehends certain octahydro-1,2,4-methenopentalen-5-yl derivatives which are used as starting materials in said processes. It is a further object of the invention to provide therapeutic compositions consisting essentially of (1) a 1-arylsulphonyl-3-(octahydro-1,2,4-methenopentalen-5-yl)-urea according to the invention, or a pharmaceutically acceptable salt thereof with an inorganic or organic base, and (2) a pharmaceutical carrier. Another object of the invention is to provide a process for producing hypoglycaemic effects in mammals involving the administration to said mammals of a 1-arylsulphonyl-3-(octahydro-1,2,4-methenopentalen-5-yl)-urea according to the present invention, or a pharmaceutically acceptable salt thereof with an inorganic or organic base.

Compounds of the Formula I

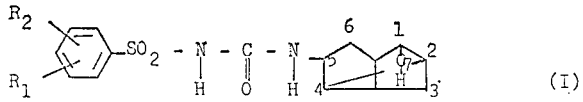

wherein
$R_1$ represents hydrogen, halogen up to the atomic number 35, lower alkyl, lower alkoxy, lower alkylthio, lower alkanoyl group or amino,
$R_2$ represents hydrogen, or
$R_1$ and $R_2$ together represent the trimethylene or the tetramethylene group, as well as their salts with inorganic or organic bases, have not been known hitherto.

In the compounds of general Formula I, $R_1$ can take the o-, m- or p-position and may be exemplified for lower alkyl as e.g. methyl, ethyl, propyl, isopropyl, butyl, isobutyl, sec. butyl, tert. butyl, pentyl, isopentyl, and 2,2-dimethyl-propyl; for lower alkoxy as e.g. methoxy, ethoxy, propoxy, isopropoxy, butoxy, isobutoxy, sec. butoxy, tert. butoxy, pentoxy, isopentoxy, and 2,2-dimethyl-propoxy; for lower alkylthio, as e.g. ethylthio, propylthio, isopropylthio, butylthio, isobutylthio, sec. butylthio, tert. butylthio, pentylthio, isopentylthio and 2,2-dimethylpropylthio and lower alkanoyl, as e.g. acetyl, propionyl, 2-methylpropionyl, butyryl, 2-methylbutyryl as well as the 3-methylbutyryl group.

The compounds of Formula I are produced according to the invention by reacting an isocyanate derivative of the Formula II

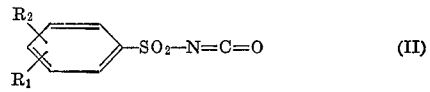

wherein
$R_1'$ represents hydrogen, halogen up to the atomic number 35, or a lower alkyl, lower alkoxy, lower alkylthio or lower alkanoyl group, or it represents a radical which can be converted by hydrolysis, reduction or reductive cleavage into an amino group,
$R_2$ represents hydrogen, or
$R_1'$ and $R_2$ together represent the trimethylene or tetramethylene group, or by reacting a reactive functional derivative of a carbamic acid of the Formula III

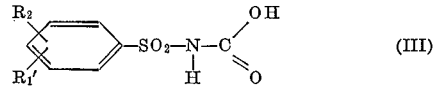

wherein $R_1'$, $R_2$ or $R_1'$ and $R_2$ together have the meanings given in Formula I or II, with octahydro-1,2,4-methenopentalene-5-amine or with an alkali metal derivative of this compound, if necessary hydrolysing or reducing the reaction product obtained to convert the group $R_1'$ into the free amino group and, if desired, converting the compound obtained of the Formula I into a salt with an inorganic or organic base.

As reactive functional derivatives of carbamic acids of the Formula III, e.g. their halides, particularly the chlorides, and their low alkyl esters, particularly the methyl or ethyl ester, also the phenyl ester can be used. Also suitable are the amides, nitroamides, low alkylamides, dialkylamides, diphenylamides, particularly N-methylamides, N,N-dimethylamides, also N-acylamides such as acetylamides, benzoylamides and 2-oxo derivatives of polymethyleneimides such as 2-oxo derivatives of pyrrolidinides, piperidides, hexamethyleneimides or octamethyleneimides.

As examples of such functional derivatives of carbamic acids of Formula III can be mentioned: the N-phenylsulphonyl carbamic acid chloride, the N-phenylsulphonyl carbamic acid methyl ester, ethyl ester and phenyl ester, the N-phenyl-sulphonyl urea, the N-nitro-N'-phenylsulphonyl urea, the N-methyl-N'-phenylsulphonyl urea, the N,N-dimethyl-N'-phenylsulphonyl urea, the N,N-diphenyl-N'-phenylsulphonyl urea, the N-benzoyl-N'-phenylsulphonyl urea, the N,N'-bis-phenylsulphonyl urea, the N-phenylsulphonyl-2-oxo-pyrrolidine-1-carboxamide, the N-phenylsulphonyl-2-oxo-piperidine-1-carboxamide, N-phenylsulphonyl-2-oxo-hexahydro-1H-azepine-1-carboxamide and also the N-phenylsulphonyl-2-oxo-octahydro-1H-azonine-1-carboxamide, or analogous compounds wherein the phenylsulphonyl radical(s) is (are) substituted by groups $R_1'R_2$, corresponding to the groups explicitly listed after Formula I for $R_1$ or $R_1R_2$.

The reaction is performed, e.g. in the cold or by heating in an inert organic solvent. Examples of suitable inert organic solvents are hydrocarbons such as benzene, toluene or xylene, ether-type liquids such as diethyl ether, dioxane or tetrahydrofuran, chlorinated hydrocarbons such as methylene chloride, and low ketones such as acetone or methylethyl ketone.

The reaction of an isocyanate, carbamic acid ester or urea can also be performed in the presence of solvents or diluents. Also, no condensing agents are necessary in general; if desired however, an alkali alcoholate for example can be used as such agent. As other condensing agents in the reaction of an isocyanate, tertiary organic bases can be used; however, isocyanates can also be used in the form of an addition product, e.g. with a tertiary organic base.

A carbamic acid halide is reacted according to the invention with octahydro-1,2,4-methenopentalene - 5 - amine preferably in the presence of an acid binding agent. Inorganic bases or salts are used as such, e.g. an alkali hydroxide, acetate, hydrogen carbonate, carbonate and phosphate such as sodium hydroxide, sodium acetate, sodium hydrogen carbonate, sodium carbonate and sodium phosphate, or the corresponding potassium compounds. Also, calcium oxide, carbonate and phosphate and magnesium carbonate can be used. Instead of inorganic bases or salts, also organic bases are suitable such as pyridine, trimethylamine or triethylamine, N,N-di-isopropylamine, triethylamine or collidine. In excess, these can also be used as solvents. Instead of octahydro-1,2,4-methenopentalene-5-amine, an alkali metal derivative of this base such as a sodium, potassium or lithium derivative can be used for the reaction according to the invention with a carbamic acid chloride.

The conversion of a group $R_1'$ in the reaction product into the free amino group, which converts the reaction product into a compound of the general Formula I, is performed by hydrolysis, reduction or reductive cleavage depending on the type of the group $R_1'$.

Groups $R_1'$ which can be converted by hydrolysis into the free amino group are, e.g. acylamino groups such as the acetamido group, or alkoxy or phenoxy carbonylamino groups such as the ethoxycarbonylamino or phenoxycarbonylamino group. Further examples are substituted methyleneamino groups such the benzylideneamino or the p-dimethylamino-benzylideneamino group. The hydrolysis to liberate the amino group can be performed, e.g. in acid medium such as by heating in dilute methanolic hydrochloric acid, or if $R_1'$ is an alkoxy or phenoxy carbonylamino group it can also be performed under mild alkaline conditions, e.g. with 1 N to 2 N sodium hydroxide solution at room temperature.

An example of a group $R_1'$ which can be converted into the amino group by reduction is the nitro group, and examples of those groups which lead to the amino group by reductive cleavage are the phenylazo or p-dimethylaminophenylazo groups. In general, the reduction of these groups can be performed catalytically, e.g. with hydrogen in the presence of Raney nickel, palladium or platinum charcoal, in an inert solvent such as ethanol. In addition to these, also other usual reduction processes can be used, e.g. the reduction of nitro groups or reductive cleavage of azo groups by means of iron in acetic or hydrochloric acid.

The octahydro-1,2,4-methenopentalene-5-amine used as starting material can be produced from isocyanic acid-(octahydro-1,2,4-methenopentalen-5-yl ester). Both compounds have not been known hitherto. They are obtained by degrading functional reactive derivatives of octahydro-1,2,4 - methenopentalene - 5 - carboxylic acid according to Curtius or Hofmann. The azide or the amide, for example, are meant by reactive functional derivatives.

For the production of the isocyanic acid ester, preferably degradation of the azide according to Curtius is used. Either the carboxylic acid is converted into the carboxylic acid chloride which is then reacted with an alkali metal azide, e.g. with sodium azide, to form the desired carboxylic acid azide; or one of the alkyl esters such as the methyl or ethyl ester, is converted direct into the carboxylic acid azide by means of hydrazine hydrate and nitrous acid, preferably in the presence of a solvent or diluent. The azide is converted into the isocyanate by thermal decomposition in a solvent which is inert to the reaction components such as aromatic hydrocarbons such as benzene, toluene, xylenes or higher boiling ethers such as dioxane. The decomposition temperature is 20–180°.

To convert the isocyanic acid ester into the octahydro-1,2,4-methenopentalene-5-amine, it is reacted first (a) with glacial acetic acid and acetic acid anhydride or (b) with an alkanol. In the first case (a), the acetamide is obtained as reaction product. This is converted into the free amine by alkaline saponification. In case (b) the carbamic acid esters corresponding to the alkanols used are obtained; these esters can be hydrolysed to form the amine mentioned both in an acid as well as a basic medium. For acid hydrolysis, e.g. hydrohalic acids, glacial acetic acid, halogenated acetic acids or mixtures of such acids can be used; for basic hydrolysis, e.g. alkali metal and alkaline earth metal hydroxides are suitable. The hydrolysis can be performed both in water as well as in an alkanol such as methanol or ethanol, or in diethylene glycol.

The amine mentioned above can also be obtained by acid amide degradation according to Hofmann. Here, the acid amide is heated, e.g. in the presence of an agent giving off bromine or chlorine in the presence of an alkali metal or alkaline earth metal hydroxide or an acid. Both water as well as an alkanol are suitable as solvent; in cases in which the degradation is performed in an alkanol, e.g. methanol or ethanol, the corresponding alcoholates are used instead of the hydroxides mentioned.

The compounds of Formula I are produced by a second process according to the invention by reacting the isocyanic acid-(octahydro-1,2,4-methenopentalen-5-yl ester) or a reactive functional derivative of (octahydro-1,2,4-methenopentalen-5-yl)-carbamic acid with a compound of the general Formula IV

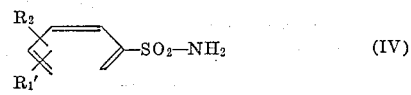

(IV)

wherein $R_1'$, $R_2$ or $R_1'R_2$ have the meanings given in Formula I or II respectively, or with an alkali metal salt of such a compound, if necessary hydrolysing or reducing the reaction product obtained to convert the group $R_1'$ into the free amino group and, if desired, converting the compound obtained of the general Formula I into a salt with an inorganic or organic base.

As reactive functional derivatives of (octahydro-1,2,4-methenopentalen-5-yl)-carbamic acid, e.g. its halides, particularly the chloride, and its low alkyl esters, particularly the methyl ester, which is new, or ethyl ester, also the phenyl ester can be used. Also amides, the nitroamide, low alkylamides, dialkylamides, diphenylamides, particularly N-methylamide, N,N-dimethylamide, also N-acylamides such as the benzoylamide, and 2-oxo-derivatives of pyrrolidinide, piperidide, hexamethyleneimide or of octamethyleneimide are suitable.

Sulphonamides of the Formula IV, benzene sulphonamide or benzene sulphonamides which are substituted by the group $R_1'$ or $R_1'R_2$ can be used as second reaction components, whereby the groups $R_1'$ or $R_1'R_2$ correspond to the groups listed following Formula I.

The reaction of the isocyanic acid-(octahydro-1,2,4-methenopentalen-5-yl ester) or that of the functional derivatives of (octahydro-1,2,4-methenopentalen-5-yl)-carbamic acid with the sulphonamides mentioned is performed as described following the first process for the corresponding starting materials. The same is true for the conversion of a group $R_1'$ in the reaction product into the free amino group which converts the reaction product into a compound of Formula I.

The production of the isocyanic acid-(octahydro-1,2,4-methenopentalen-5-yl ester) mentioned as starting material is mentioned following the first process. Other starting materials for the process can be produced starting from this isocyanic acid with a low alkanol such as methanol, the isocyanic acid ester mentioned yields, e.g. low alkyl esters of (octahydro-1,2,4-methenopentalen-5-yl)-carbamic acid such as the methyl ester and also, with ammonia in tetrahydrofuran, it yields the (octahydro- 1,2,4-methenopentalen-5-yl)-urea. Other urea derivatives of this type can be produced analogously by, for example, using a low alkylamine or dialkylamine such as methylamine or dimethylamine, instead of ammonia.

Compounds of general Formula I are produced by a third process according to the invention by desulphurising a thiourea derivative of the general Formula V

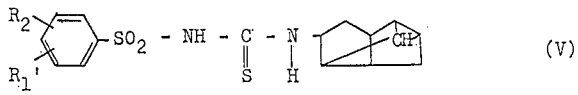

wherein $R_1'$, $R_2$ or $R_1'R_2$ have the meanings given in Formulae I and II, if necessary, hydrolysing or reducing the reaction product obtained to convert the group $R_1'$ into the free amino group and, if desired, converting the reaction product obtained into a salt with an inorganic or organic base.

The desulphurisation can be performed, e.g. with an oxidising agent in acid, alkaline or neutral medium. Suitable oxidising agents are, e.g. potassium ferricyanide, iron-III chloride, potassium permanganate, potassium chlorate, potassium hypochlorite or potassium hypoiodite solution. Hydrogen peroxide or sodium peroxide in alkaline solution, e.g. sodium hydroxide solution, are particularly advantageous oxidising agents. In addition, heavy metal compounds such as mercury oxide or lead oxide can also be used for the desulphurisation. These metal oxides are advantageously used in an aqueous organic solvent. Suitable organic solvents are, e.g. low alkanols such as methanol, alkane polyols such as glycol or glycerine, ethereal liquids such as tetrahydrofuran or dioxan, ketones such as acetone or methylethyl ketone, carboxylic acid amides such as N,N-dimethyl formamide and, also urea derivatives such as 1,1,3,3-tetramethyl urea.

The subsequent conversion of a group $R_1'$ in the reaction product into the free amino group which converts the product into a compound of Formula I can be performed as described at the end of the first process. The hydrolysis of group $R_1'$ to the amino group there mentioned, however, can also be performed simultaneously with the desulphurisation.

Starting materials of the Formula V are, e.g. those compounds the substituents $R_1'$ and $R_2$ of which conform to the groups listed at the end of Formulae I or II for the groups $R_1$, $R_2$ or $R_1R_2$, or $R_1'$, $R_2$ or $R_1'R_2$ respectively. These starting materials are new and form part of the present invention. An example of such starting material is, e.g. 1-(p-tolylsulphonyl)-2-(octahydro-1,2,4-methenopentalen-5-yl)-thiourea which can be produced, e.g. from p-tolylsulphonyl isothiocyanate and octahydro-1,2,4-methenopentalen-5-amine in toluene or from p-tolylsulphonylamide and octahydro-1,2,4-methenopentalen-5-yl-isothiocyanate in acetone/water. Other starting materials of this type can be produced analogously.

As stated above the invention also concerns the conversion of the 1-arylsulphonyl-3-(octahydro-1,2,4-methenopentalen-5-yl)-ureas into salts with inorganic or organic bases. These salts have the same valuable pharmacological properties as the free compounds of Formula I and can be prepared according to the usual methods well known in the art. Pharmaceutically acceptable inorganic or organic bases such as alkali or alkaline earth hydroxides, carbonates or bicarbonates, triethanolamine, choline, N'-dimethyl-biguanidine or N'-(β-phenyl-ethyl)-biguanidine, can be used for example for salt formation.

The 1 - arylsulphonyl-3-(octahydro-1,2,4-methenopentalen-5-yl)-ureas of the Formula I as well as their pharmaceutically acceptable inorganic or organic bases have now been found unexpectedly to exhibit valuable pharmacological properties. On oral or parenteral administration they show hypoglycaemic action which characterises them as suitable for the treatment of diabetes.

Representative of these compounds are particularly 1-phenylsulphonyl-3-(octahydro-1,2,4-methenopentalen-5-yl)-urea
1-(p-tolylsulphonyl)-3-(octahydro-1,2,4-methenopentalen-5-yl)-urea
1-(p-chloro-phenylsulphonyl)-3-(octahydro-1,2,4-methenopentalen-5-yl)-urea
1-(p-bromo-phenylsulphonyl)-3-(octahydro-1,2,4-methenopentalen-5-yl)-urea
1-(p-methoxy-phenylsulphonyl)-3-(octahydro-1,2,4-methenopentalen-5-yl)-urea
1-(p-ethoxy-phenylsulphonyl)-3-(octahydro-1,2,4-methenopentalen-5-yl)-urea
1-(p-acetyl-phenylsulphonyl)-3-(octahydro-1,2,4-methenopentalen-5-yl)-urea
1-(p-methylthio-phenylsulphonyl)-3-(octahydro-1,2,4-methenopentalen-5-yl)-urea
1-(p-sulphanilyl)-3-(octahydro-1,2,4-methenopentalen-5-yl)-urea, and
1 - (5 - indanyl-sulphonyl)-3-(octahydro-1,2,4-methenopentalen-5-yl)-urea, as well as the salts thereof with inorganic or organic bases.

Particularly interesting compounds according to the invention which exhibit hypoglycaemic action to a favorable degree are 1-arylsulphonyl-3-(octahydro-1,2,4-methenopentalen-5-yl)-ureas of the formula

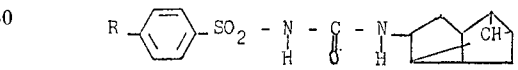

wherein R has the meaning as given in Formula I for $R_1$, as well as the salts thereof with inorganic or organic bases. The hypoglycaemic action of the compounds according to the invention may ilustratively be demonstrated e.g. by means of the following test:

The substance to be tested for hypoglycaemic action is suspended in tap water with the aid of tragacanth and is administered by means of stomach sound. Five rats of an average weight of 180 g. which have not been fed for 6½ hours before the start of the test and/or six rabbits of an average weight of 2.5 kg. which have not been fed for 24 hours before the start of the test, are used as test animals.

Blood samples are taken from the tail vein of the animal when using rats in the test, and from the ear vein of the animals when using rabbits, immediately before, and in intervals, up to 24 hours after, administration of the test substance. The blood sugar is determined according ot Hagedorn-Jensen, Biochemische Zeitschrift 135,46 (1923), and, with the autoanalyser, according to W. S. Hoffman, J. Biol. Chem. 120,51 (1937), respectively.

1 - (p - chloro-phenylsulphonyl)-3-(octahydro-1,2,4-methenopentalen-5-yl)-urea administered orally in this test in amounts of from 0.5–100 mg./kg. of bodyweight for the rabbit or from 2–100 mg./kg. of bodyweight for the rat, causes a strong, long lasting (>24 h.) reduction of the blood sugar.

On peroral administration of from 0.5 to 100 mg./kg. of bodyweight of 1-(p-tolylsulphonyl)-3-(octahydro-1,2,4-methenopentalen-5-yl)-urea to the rabbit or of from 2 to 100 mg./kg. to the rate the same strong, long lasting blood-sugar-lowering effect could be observed.

Significant to strong, blood-sugar-lowering effect over a period of over 24 hours could be observed when administering perorally to the rabbit or to the rat, 1-(p-methoxy-phenylsulphonyl)-3-(octahydro-1,2,4-methenopentalen-5-yl)-urea 20–100 mg./kg. (rabbit),
1-(p-bromo-phenylsulphonyl)-3-(octahydro-1,2,4-methenopentalen-5-yl)-urea 10–100 mg./kg. (rabbit),
1 - (5 - indanylsulphonyl)-3-(octahydro-1,2,4-methenopentalen-5-yl)-urea 10–100 mg./kg. (rabbit) 10–50 mg./kg. (rat).

The compounds of the invention have a favorable therapeutic index, their toxicity is low. The $DL_{50}$ of e.g.

1 - (p - tolyl - sulphonyl)-3-(octahydro-1,2,4-methenopentalen-5-yl)-urea P.O. in rat is >2500 mg./kg. of bodyweight.

For their intended use the 1-arylsulphonyl-3-(octahydro-1,2,4-methenopentalen-5-yl)-ureas of the Formula I as well as their pharmaceutically acceptable salts with inorganic or organic bases are administered, preferably, orally. The amount administered will depend on the species, age and weight of the treated subject, but in general the daily dosages vary between about 100 mg. and 200 mg.

The compositions are presented for e.g. oral administration is dosage units such as tablets, dragees (sugar-coated tablets), and the like.

Dosage units such as dragées and tablets preferably contain 100–500 mg. of an active substance according to the invention, actually 20 to 80% of a compound of general Formula I. They are produced by combining the active substance with, e.g. solid purverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols of suitable molecular weights, to form tablets or dragée cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

The following prescriptions further illustrate the production of tablets and dragées:

(a) 1,000 g. of 1-(p-tolylsulphonyl)-3-octahydro-1,2,4-methenopentalen-5-yl)-urea are mixed with 550 g. of lactose and 292 g. of potato starch, the mixture is moistened with an aqueous solution of 8.0 g. of gelatine and granulated through a sieve. After drying, 60.0 g. of potato starch, 60.0 g. of talcum, 10.0 g. of magnesium stearate and 20.0 g. of colloidal silicon dioxide are mixed in and the mixture is pressed into 10,000 tablets each weighing 200 mg. and containing 100 mg. of active substance. If desired, the tablets can be grooved for better adaptation of the dosage.

(b) A granulate is produced from 1,000 g. of 1-(p-chlorophenylsulphonyl)-3-(octahydro - 1,2,4 - methenopentalen-5-yl)-urea, 379 g. of lactose and the aqueous solution of 6.0 g. of gelatine. After drying, the granulate is mixed with 10.0 g. of colloidal silicon dioxide, 40.0 g. of talcum, 60 g. of potato starch and 5.0 g. of magnesium stearate and the mixture is pressed into 10,000 dragée cores. These are then coated with a concentrated syrup made from 533.5 g. of crystallised saccharose, 20.0 g. of shellac, 75.0 g. of gum arabic, 250 g. of talcum, 20 g. of colloidal silicon dioxide and 1.5 g. of dyestuff, and dried. The dragées obtained each weigh 240 mg. and contain 100 mg. of active substance.

The following examples further illustrate the production of the new compounds of general Formula I and of hitherto undescribed intermediate products but they are by no means the only way of producing same. The temperatures are given in degrees centigrade. Percentages are given by weight.

EXAMPLE 1

(a) 18.3 g. of phenylsulphonyl isocyanate are added to 13.5 g. of octahydro-1,2,4-methenopentalene-5-amine dissolved in 120 ml. of abs. toluene. The crude product crystallises out. On completion of the exothermic reaction, the mixture is cooled to room temperature and the 1-phenylsulphonyl-3-(octahydro-1,2,4 - methenopentalen-5-yl)-urea is filtered off under suction. It is recrystallised from methanol whereupon the pure compound melts at 200°.

The starting substance, octahydro-1,2,4-methenopentalene-5-amine, is produced as follows:

(b) 164 g. of octahydro-1,2-4-methenopenalene-5-carboxylic acid [cf. H. K. Hall, J. Org. Chem. 25, 42 (1960)], 1 litre of benzene and 4 ml. of pyridine are slightly heated in a steam bath. 250 g. of thionyl chloride are then added dropwise within 15 minutes in such a way that the reaction proceeds by itself with development of sulphur dioxide. On completion of the addition of thionyl chloride, the reaction mixture is heated for 15 minutes in a water bath, then evaporated in vacuo, 200 ml. of petroleum ether are added to the residue, the mixture is left to stand for 30 minutes and the precipitate formed is filtered off. The octahydro-1,2,4-methenopentalene-5-carbonyl chloride obtained is distilled; it boils at 63–65°/2 Torr.

(c) 93 g. of sodium azide are dissolved in 860 ml. of acetone and in the same amount of water. 90 g. of octahydro - 1,2,4-methenopentalene-5-carbonyl chloride are then added within 5 to 10 minutes, the temperature in the reaction vessel being adjusted to 0–2° by exterior cooling. On completion of the addition of the chloride, the reaction mixture is stirred for another 50 minutes whereupon it is first extracted with 1 litre and then with 300 ml. of ice cold benzene. The combined benzene extracts are dried at 0–5° with finely pulverised calcium chloride and the solution, after removal of calcium chloride by filtration, is heated in a steam bath for 2.5 hours. Nitrogen is developed and the solution foams. The solvent is then evaporated from the reaction mixture and the residue is distilled. The isocyanic acid-(octahydro-1,2,4-methenopentalen-5-yl ester) obtained boils at 70–75°/3 Torr.

(d) 16.1 g. of the isocyanic acid ester produced according to Example 1(c) are boiled for 100 minutes in a mixture of 25 ml. of glacial acetic acid and 15 ml. of acetic acid anhydride. On completion of the carbon dioxide development, 35 ml. of solvent are distilled off from the reaction mixture, the residue is poured into 100 ml. of water and then the whole is stirred for 3 hours. The precipitated crystalline crude product is taken up in 175 ml. of ether, the ethereal solution is washed with 15 ml. of water, dried over sodium sulphate and the ether is evaporated off. The crude product which remains is distilled whereupon the N-(octahydro-1,2,4-methenopentalen-5-yl)-acetamide boils at 120–125°/0.05 Torr and melts at 77–80°.

(e) 26.5 g. of the amide obtained according to Example 1(d) are boiled in a solution of 200 ml. of diethylene glycol monomethyl ether and 42 g. of potassium hydroxide in 50 ml. of water. 35 ml. of water are distilled off from this reaction mixture and the residue is refluxed for 8 hours at an inner temperature of 120°. The crude product is then poured into 600 ml. of water and the solution is extracted five times with 80 ml. of ether each time. The combined ether extracts are washed twice with 20 ml. of saturated sodium chloride solution each time, the extract is dried over sodium sulphate and the solution is evaporated. The crude amine which remains is distilled; it boils at 82–84° under a pressure of 12 Torr. The distillate obtained, which still contains diethylene glycol monoethyl ether, is purified by way of the hydrochloride as follows: the crude base obtained is dissolved in 1.5 litres of dry ether; hydrogen chloride is introduced into this solution at 0° until no more hydrochloride precipitates; the hydrochloride is filtered off, washed with ether and dried in vacuo; 117 g. of the hydrochloride obtained are dissolved in 100 ml. of water and the solution is well shaken with 200 ml. of 4 N sodium hydroxide solution; the liberated amine is extracted four times with 150 ml. of ether each time, the ethereal solution is dried over sodium sulphate, the ether is evaporated off and the residue is distilled. The octahydro-1,2,4-methenopentalene-5-amine obtained is a colourless liquid which boils at 81–83°/12 Torr; $n_D^{20}$: 1.5160.

The same compound can also be produced according to Example 1(f–g) and (h–k).

(f) A solution of 48.3 g. of isocyanic acid-(octahydro-1,2,4-methenopentalen-5-yl ester) in 200 ml. of methanol is refluxed for 10 hours. The solvent is evaporated off in vacuo; the crystalline residue melts at 81–83°. After recrystallisation from petroleum ether, the (octahydro-1,2,4-methenopentalen-5-yl) carbamic acid methyl ester obtained melts at 84–86°.

(g) 29 g. of the carbamic acid ester obtained according to Example 1 (f) are boiled with 42 g. of potassium hydroxide in a solution of 50 ml. of water and 200 ml. of diethylene glycol monomethyl ether. 35 ml. of water slowly distill off and the boiling point of the solution rises to 125°. The mixture is then boiled for 8 hours, poured into 600 ml. of water and the solution is extracted five times with 80 ml. of ether each time. The combined ether extracts are washed twice with 20 ml. of saturated sodium chloride solution each time and then dried over sodium sulphate. Distillation off of the ether yields the crude octahydro-1,2,4-methenophentalene-5-amine which is purified by way of the hydrochloride as described in Example 1 (e).

(h) 10 g. of octahydro-1,2,4-methenopentalene-5-carboxylic acid ethyl ester, 40 ml. of a 26% aqueous ammonia solution and 5 ml. of methanol are heated in an autoclave for 10 hours at 140°. Volatile parts are removed from the reaction product under water jet vacuum and 25 ml. of acetone are added to the residue. The residue is recrystallised from water. The octahydro-1,2,4-methenopentalene-5-carboxamide melts at 160–169°.

(i) 16.3 g. of the amide produced according to Example 1 (h) are dissolved in 500 ml. of methanol. 11 g. of sodium methylate are then added to the reaction mixture and the solution is cooled to 5°. 16 g. of bromine are added, the whole is left to stand for 30 minutes, the mixture is then heated for 45 minutes in a steam bath, acetic acid is added until the reaction is neutral and all volatile products are removed in vacuo. The residue is well shaken with 100 ml. of water. The water is decanted. 250 ml. of petroleum ether are added to the insoluble residue, the whole is left to stand for some hours and filtered. The filtrate is concentrated and the oily residue is distilled at 97–101°/0.02 torr. The (octahydro-1,2,4-methenopentalen-5-yl)-carbamic acid methyl ester crystallises and, after recrystallisation from petroleum ether, melts at 84–86°.

(k) 29 g. of the carbamic acid ester produced according to Example 1 (i) are boiled with 42 g. of potassium hydroxide in a solution of 50 ml. of water and 200 ml. of diethylene glycol monomethyl ether. 35 ml. of water slowly distill off after which the boiling point of the solution rises to 125°. The reaction mixture is then boiled for 8 hours, poured into 600 ml. of water and extracted five times with 80 ml. of ether each time. The combined ether extracts are washed twice with 20 ml. of saturated sodium chloride solution each time and then dried over sodium sulphate. After evaporation of the ether, distillation at 82–84°/12 torr, yields crude octahydro-1,2,4-methenopentalene-5-amine which is purified by way of the hydrochloride as described in Example 1 (e).

EXAMPLE 2

The following end products are obtained analogously to Example 1 (a) starting from 13.5 g. of octahydro-1,2,4-methenopentalene-5-amine:
(a) with 19.7 g. of p-tolylsulphonyl isocyanate, 1-(p-tolylsulphonyl) - 3-(octahydro-1,2,4-methenopentalen-5-yl)-urea, M.P. 207–209° (from ethanol) and
(b) with 22 g. of p-chlorophenylsulphonyl isocyanate, 1-(p - chlorophenylsulphonyl) - 3 - (octahydro - 1,2,4-methenopentalen-5-yl)-urea, M.P. 222–223° (from ethanol).

EXAMPLE 3

24.3 g. of (p-tolylsulphonyl)-carbamic acid ethyl ester and 13.5 g. of octahydro-1,2,4-methenopentalene-5-amine in 400 ml. of abs. dioxane are boiled for 4 hours. The solution is evaporated in vacuo and the residue is recrystallised from methanol. The 1-(p-tolylsulphonyl)-3-(octahydro-1,2,4-methenopentalen-5-yl)-urea obtained melts at 207–209°. According to the melting point and the melting point when mixed with the compound obtained according to Example 2 (a), it is identical with that compound.

EXAMPLE 4

The following end products are obtained analogously to Example 3 starting from 13.5 g. of octahydro-1,2,4-methenopentalene-5-amine:
(a) with 25.9 g. of (p-methoxy-phenylsulphonyl)-carbamic acid ethyl ester, 1-(p-methoxy-phenylsulphonyl)-3 - (octahydro-1,2,4-methenopentalen-5-yl)-urea, M.P. 184–186°, and
(b) with 27.3 g. of (p-ethoxy-phenylsulphonyl)-carbamic acid ethyl ester, 1-(p-ethoxy-phenylsulphonyl)-3-(octahydro - 1,2,4 - methenopentalen-5-yl)-urea, M.P. 121–123° (recrystallised from dilute methanol).

EXAMPLE 5

23 g. of (p-methoxy-phenylsulphonyl)-urea and 13.5 g. of octahydro-1,2,4-methenopentalene-5-amine in 800 ml. of abs. dioxane are refluxed for 1 hour while stirring vigorously. Ammonia is developed. After concentrating the reaction mixture in vacuo, the residue is recrystallised from dilute methanol. 1-(p-methoxy-phenylsulphonyl)-3-(octahydro - 1,2,4 - methenopentalen-5-yl)-urea melts at 184–186°. According to the melting point and the melting point when mixed with the compound obtained according to Example 4 (a), it is identical with that compound.

EXAMPLE 6

The following end products are obtained analogously to Example 5 starting from 13.5 g. of octahydro-1,2,4-methenopentalene-5-amine:
(a) with 24.4 g. of (p-ethoxy-phenylsulphonyl)-urea, 1-(p - ethoxy - phenylsulphonyl) - 3 - (octahydro - 1,2,4-methenopentalen-5-yl)-urea, M.P. 121–123° which, according to its melting point and that when mixed with the compound obtained according to Example 4 (b), is identical with that compound;
(b) with 24.2 g. of (p-acetyl-phenylsulphonyl)-urea, 1-(p - acetyl - phenylsulphonyl) - 3 - (octahydro - 1,2,4-methenopentalen-5-yl)-urea, M.P. 163–165°;
(c) with 21.5 g. of p-sulphanilyl urea, 1-(p-sulphanilyl)-3-(octahydro - 1,2,4 - methenopentalen-5-yl)-urea, M.P. 199–201°;
(d) with 24.6 g. of (p-methylthio-phenylsulphonyl)-urea, 1 - (p - methylthio-phenylsulphonyl)-3-(octahydro-1,2,4-methenopentalen-5-yl)-urea, M.P. 160–162°;
(e) with 23.7 g. of p-chlorophenylsulphonyl urea, 1-(p-chloro - phenylsulphonyl)-3-(octahydro-1,2,4-methenopentalen-5-yl)-urea, M.P. 222–223° which, according to its melting point and that when mixed with the compound described in Example 2 (b), is identical with that compound;
(f) with 21.8 g. of (p-fluorophenylsulphonyl)-urea-1-(p-fluorophenylsulphonyl) - 3 - (octahydro-1,2,4-methenopentalen-5-yl)-urea, and
(g) with 24 g. of (5-indanylsulphonyl)-urea, 1-(5-indanylsulphonyl) - 3 - (octahydro-1,2,4-methenopentalen-5-yl)-urea, M.P. 150–152°.

EXAMPLE 7

13.5 g. of octahydro-1,2,4-methenopentalene-5-amine and 1-acetyl-3-(p-methoxy-phenylsulphonyl)-urea in 500 ml. of abs. dioxane are refluxed for 1 hour while stirring energetically. The reaction mixture is then concentrated in vacuo and water is added. The crystals which precipitate are filtered off under suction, washed with water and recrystallised with dilute methanol. The pure 1-(p-methoxy-phenylsulphonyl) - 3 - (octahydro-1,2,4-methenopentalen-5-yl)-urea melts at 184–186°.

EXAMPLE 8

13.5 g. of octahydro-1,2,4-methenopentalene-5-amine and 28.2 g. of N-(p-tolylsulphonyl)-2-oxo-pyrrolidine-1-carboxamide (M.P. 145–147°) in 500 ml. of abs. dioxane are refluxed for 30 minutes. The mixture is then concentrated to dryness in vacuo and water is added to the residue. The crystals are filtered off under suction and washed with water. Recrystallised from ethanol, the pure 1-(p-tolylsulphonyl)-3-(octahydro - 1,2,4 - methenopentalen-5-yl)-urea melts at 207–209°.

EXAMPLE 9

The following end products are obtained analogously to Example 8 starting from 13.5 g. of octahydro-1,2,4-methenopentalene-5-amine:

(a) with 33.1 g. of N-(p-chlorophenylsulphonyl)-2-oxo-hexahydro-1H-azepine - 1 - carboxamide (M.P. 120–121.5°), 1 - (p - chlorophenylsulphonyl)-3-(octahydro-1,2,4-methenopentalen-5-yl)-urea, M.P. 222–223° and (b) with 29.6 g. of N-phenylsulphonyl-2-oxo-hexahydro-1H-azepine - 1 - carboxamide (M.P. 107–108.5°), 1-phenylsulphonyl - 3 - (octahydro - 1,2,4 - methenopentalen-5-yl)-urea, M.P. 200°.

EXAMPLE 10

23 g. of p-bromobenzene sulphonamide and 6 g. of pulverised potassium hydroxide in 500 ml. of dioxane are refluxed for 2 hours with 16.0 g. of isocyanic acid-(octahydro-1,2,4-methenopentalen-5-yl ester). The reaction mixture is then concentrated in vacuo, water is added and undissolved parts are filtered off. The filtrate is carefully acidified with 2 N hydrochloric acid whereupon the crude product slowly crystallises out. Recrystallisation from methanol yields the pure 1-(p-bromophenylsulphonyl)-3-(octahydro-1,2,4-methenopentalen - 5 - yl)-urea, M.P. 218–220°.

EXAMPLE 11

The following end products are obtained analogously to Example 10 starting from isocyanic acid-(octahydro-1,2,4-methenopentalen-5-yl ester):

(a) with 18.6 g. of p-methoxybenzene sulphonamide, 1 - (p-methoxyphenylsulphonyl)-3-(octahydro - 1,2,4-methenopentalen-5-yl)-urea, M.P. 184–186°;

(b) with 20.1 g. of p-ethoxybenzene sulphonamide, 1-(p-ethoxyphenylsulphonyl)-3-(octahydro - 1,2,4-methenopentalen-5-yl)-urea, M.P. 121–123°;

(c) with 19.9 g. of p-acetylbenzene sulphonamide, 1-(p-acetylphenylsulphonyl)-3-(octahydro - 1,2,4 - methenopentalen-5-yl)-urea which melts at 163–165°, and (d) with 19.7 g. of 5-indane sulphonamide, 1-(5-indanyl-sulphonyl)-3-(octahydro - 1,2,4 - methenopentalen-5-yl)-urea, M.P. 150–152°.

EXAMPLE 12

A reaction mixture composed of 19.3 g. of p-tolylsulphonamide-sodium salt, 20 g. of potassium carbonate and 40 g. of (octahydro - 1,2,4 - methenopentalen-5-yl)-carbaminic acid methyl ester is heated to 130–140°. After 3 hours the reaction is left to cool and water is added thereto. The excess of carbaminic acid ester is then extracted with ether from this mixture and the aqueous phase is separated and acidified with dilute hydrochloric acid. A precipitate forms, which is filtered off, washed with water and recrystallised from ethanol. The 1-(p-tolylsulphonyl) - 3 - (octahydro-1,2,4-methenopentalen-5-yl)-urea thus obtained, melts at 207–209°.

Analogously to this example are obtained:

starting from 21.3 g. of p-chlorophenylsulphonylamide-sodium salt the 1-(p-chlorophenylsulfonyl)-3-octahydro-1,2,4-methenopentalen-5-yl)-urea, melting at 222–223°, and starting from 20.9 g. of p-methoxyphenylsulfonylamide-sodium salt the (p-methoxyphenylsulphonyl)-3-(octahydro-1,2,4-methenopentalen-5-yl) - urea melting at 184–186°.

EXAMPLE 13

34 g. of mercuric chloride are dissolved in 300 ml. of water and transformed into mercuric oxide by adding dropwise, while stirring, 125 ml. of 2 N sodium hydroxide. Then 34.8 g. of 1-(p-tolylsulphonyl)-3-(octahydro-1,2,4-methenopentalen - 5 - yl)-thiourea (M.P. 185–186, produced by reaction of p-tolylsulphonylisothiocyanate and octahydro-1,2,4-methenopentalen - 5 - yl-amine in toluene) are dissolved in a solution of 100 ml. of sodium hydroxide and 100 ml. of dimethyl formamide and this solution is added dropwise while stirring at 60° to the mercuric oxide suspension. After 3 hours, the mercuric sulfide which has formed, is filtered off and washed with a small amount of water. The filtrate is acidified with diluted hydrochloric acid, the precipitate that forms is filtered off and recrystallised from ethanol. The 1-(p-tolylsulphonyl) - 3 - (octahydro-1,2,4-methenopentalen-5-yl)-urea melts at 207–209° and is identical with the compound obtained in Example 2a.

What is claimed is:

1. A compound selected from the group consisting of a sulfonylurea of the formula:

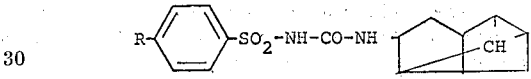

wherein

R represents hydrogen, halogen up to the atomic number 35, lower alkyl, lower alkoxy, lower alkylthio, lower alkanoyl or amino and a salt thereof with a pharmaceutically acceptable inorganic or organic base.

2. A compound as defined in claim 1 which is 1-phenyl-sulfonyl-3-(octahydro-1,2,4-methenopentalen-5-yl)-urea.

3. A compound as defined in claim 1 which is 1-(p-tolylsulfonyl)-3-(octahydro - 1,2,4 - methenopentalen - 5-yl)-urea.

4. A compound as defined in claim 1 which is 1-(p-chloro - phenylsulfonyl)-3-(octahydro-1,2,4-methenopentalen-5-yl)-urea.

5. A compound as defined in claim 1 which is 1-(p-bromo-phenylsulfonyl)-3-(octahydro - 1,2,4-methenopentalen-5-yl)-urea.

6. A compound as defined in claim 1 which is 1-(p-methoxy-phenylsulfonyl)-3-(octahydro - 1,2,4 - methenopentalen-5-yl)-urea.

7. A compound as defined in claim 1 which is 1-(p-ethoxy-phenylsulfonyl)-3-(octahydro-1,2,4 - methenopentalen-5-yl)-urea.

8. A compound as defined in claim 1 which is 1-(p-acetyl-phenylsulfonyl)-3-(octahydro-1,2,4 - methenopentalen-5-yl)-urea.

9. A compound as defined in claim 1 which is 1-(p-methylthio-phenylsulfonyl)-3-(octahydro - 1,2,4-methenopentalen-5-yl)-urea.

10. A compound as defined in claim 1 which is 1-(p-sulphanilyl)-3-(octahydro-1,2,4-methenopentalen-5-yl)-urea.

References Cited

Chemical Abstracts, volume 63, column 17976, line f (1965).

BERNARD HELFIN, Primary Examiner

G. A. SCHWARTZ, Assistant Examiner

U.S. Cl. X.R.

260—552, 553; 424—228, 322